(12) United States Patent
Bando

(10) Patent No.: US 8,740,514 B2
(45) Date of Patent: *Jun. 3, 2014

(54) METHOD OF DRILLING HOLES IN A GLASS PLATE AND APPARATUS THEREOF

(75) Inventor: Kazuaki Bando, Tokushima (JP)

(73) Assignee: Bando Kiko Co., Ltd., Tokushima (JP)

( * ) Notice: Subject to any disclaimer, the term of this patent is extended or adjusted under 35 U.S.C. 154(b) by 452 days.

This patent is subject to a terminal disclaimer.

(21) Appl. No.: 13/064,930

(22) Filed: Apr. 27, 2011

(65) Prior Publication Data

US 2011/0222977 A1     Sep. 15, 2011

Related U.S. Application Data

(62) Division of application No. 11/918,130, filed as application No. PCT/JP2005/007267 on Apr. 14, 2005, now Pat. No. 7,955,033.

(51) Int. Cl.
*B23B 41/00* (2006.01)

(52) U.S. Cl.
USPC ................................... 408/89; 269/21; 279/3

(58) Field of Classification Search
USPC ................. 269/21; 408/56, 87, 89, 90; 279/3
IPC ............. C03B 33/10,33/00; B23B 47/00, 41/00
See application file for complete search history.

(56) References Cited

U.S. PATENT DOCUMENTS

| | | | |
|---|---|---|---|
| 2,049,970 A | 8/1936 | Allister | |
| 4,183,545 A | 1/1980 | Daly | |
| 7,955,033 B2 * | 6/2011 | Bando | 408/1 R |
| 2004/0179908 A1 | 9/2004 | Bando | |

FOREIGN PATENT DOCUMENTS

| | | |
|---|---|---|
| DE | 883 876 C | 7/1953 |
| JP | 51 151707 A | 12/1976 |
| JP | 02-088109 | 3/1990 |
| JP | 07-009267 | 1/1995 |
| JP | 08-183023 | 7/1996 |
| JP | 2001-071323 A | 3/2001 |
| JP | 2004-351655 A | 12/2004 |

OTHER PUBLICATIONS

Supplementary European Search Report in EP 05 73 0554 dated Feb. 3, 2011.
International Search Report of the PCT mailed Jul. 26, 2005.

\* cited by examiner

*Primary Examiner* — Daniel Howell
(74) *Attorney, Agent, or Firm* — Nixon & Vanderhye P.C.

(57) ABSTRACT

An apparatus for drilling holes in a glass plate has a supporting member for sucking and supporting a glass plate which is used for an automobile window or the like, as described later, and the supporting member is comprised of a suction pad for sucking the glass plate and a pair of supports for supporting the glass plate on an outer side of the suction pad. The supports are detachably mounted on the outer side of the suction pad, and the supporting member is adapted to rotate about the suction pad in an R direction. The apparatus for drilling holes in a glass plate further includes a hole forming means for forming in the glass plate holes shown in FIG. 7; a supporting means having the supporting member and for supporting the glass plate in which the holes are to be formed by the hole forming means; and a transporting means for transporting onto the supporting means the glass plate in which the holes are to be formed.

1 Claim, 7 Drawing Sheets

(a)

(b)

METHOD OF DRILLING HOLES IN A GLASS PLATE AND APPARATUS THEREOF

This application is a divisional of application Ser. No. 11/918,130 filed Oct. 10, 2007 now U.S. Pat. No 7,955,033, which in turn is the U.S. national phase of International Application No. PCT/JP2005/007267 filed 14 Apr. 2005 which designated the U.S., the entire content of which is hereby incorporated herein by reference.

TECHNICAL FIELD

The present invention relates to a method of drilling holes in a glass plate for drilling holes (including the formation of recesses) in glass plates of various sizes and shapes, as well as an apparatus thereof.

BACKGROUND ART

Patent document 1: JP-A-2-88109

As shown in the patent document 1, for example, a conventional apparatus for drilling holes in a glass plate is so arranged that a central area of a glass plate is sucked and supported by a circular and small supporting member so that hole drilling in glass plates of various sizes and shapes can be performed as practically as possible.

DISCLOSURE OF THE INVENTION

Problems that the Invention is to Solve

Incidentally, in the case where the glass plate is a thin and rectangular, large-sized one as in the case of a front window glass or a rear window glass of an automobile, even if the central area is sucked and supported by a small supporting member, the periphery (peripheral edges) of the glass plate, particularly both longitudinal end sides of the glass plate, are deflected greatly, and the glass plate as a whole assumes a curved state. In such a case, the glass plate in a state in which distortion is acting is unfavorably subjected to hole drilling, so that satisfactory hole drilling cannot be performed with respect to such a glass plate. For this reason, supporting members for sucking and supporting the glass plates and corresponding to the sizes and shapes of the glass plates must be prepared in advance, and the supporting member must be replaced each time the size and shape of the glass plate is changed.

The present invention has been devised in view of the above-described inconvenient operation. An object of the invention is to provide a method of and an apparatus for drilling holes in a glass plate which is capable of supporting glass plates of various sizes and shapes without causing deflection, particularly deflection at both longitudinal end sides of the glass plate, without needing to replace the supporting member for supporting (holding) the glass plate, thereby making it possible to perform satisfactory hole drilling.

Means for Solving the Problems

In a method of drilling holes in a glass plate in accordance with the invention, a supporting member is rotated in a preliminary step for placing a glass plate on the supporting member, so as to move a support of the supporting member for supporting the glass plate to a portion of the glass plate in which deflection can possibly occur when the glass plate is in a posture of being subjected to drilling; after the rotation of the supporting member, the glass plate to be drilled is caused to be placed on and sucked and supported by the supporting member; and a hole is drilled in the sucked and supported glass plate. According to such a method of drilling holes in a glass plate, it is possible to attain the above-described object.

In an apparatus for drilling holes in a glass plate in accordance with the invention, a supporting member for sucking and supporting a glass plate is comprised of a suction pad for sucking the glass plate and a support for supporting the glass plate on an outer side of the suction pad, the support being detachably mounted on the outer side of the suction pad, the supporting member being adapted to rotate about the suction pad.

According to the apparatus for drilling holes in a glass plate in accordance with the invention, before the glass plate is supplied to the supporting member, in order to support a portion of the glass plate in which deflection can possibly occur when the glass plate is in a posture of being subjected to drilling, the supporting member is rotated in advance to position the support at the portion of the glass plate in which deflection can possibly occur. In due course of time, the glass plate can be supplied, and sucked and supported, and hole drilling can be performed. For this reason, it becomes unnecessary to prepare the supporting members of various sizes and shapes in correspondence with the sizes and shapes of the glass plates, so that extra operation of replacing the supporting member becomes unnecessary. In addition, in cases where the glass plate is small, it suffices if the support on the outer side of the suction pad is kept removed.

In a preferred example of the apparatus for drilling holes in a glass plate in accordance with the invention, a distance from a first portion at a peripheral edge portion of the support to an axis of rotation of the support by a rotating means is different from a distance from a second portion, which is different from the first portion, at the peripheral edge portion of the support to the axis of rotation.

In another preferred example of the apparatus for drilling holes in a glass plate in accordance with the invention, the shape of a peripheral edge of the supporting member is non-circular.

In still another preferred example of the apparatus for drilling holes in a glass plate in accordance with the invention, the shape of the supporting member is an elongated shape.

Advantages of the Invention

According to the invention, it is possible to provide a method of and an apparatus for drilling holes in a glass plate which is capable of supporting glass plates of various sizes and shapes without causing deflection, particularly deflection at both longitudinal end sides of the glass plate, without needing to replace the supporting member for supporting (holding) the glass plate, thereby making it possible to perform satisfactory hole drilling.

BEST MODE FOR CARRYING OUT THE INVENTION

Next, a more detailed description will be given of a mode for carrying out the invention with reference to an embodiment illustrated in the drawings. It should be noted that the invention is not limited to such an embodiment.

In FIGS. 1 to 6, an apparatus 1 for drilling holes in a glass plate in accordance with this embodiment has a supporting member 44 for sucking and supporting a glass plate 2 which is used for an automobile window or the like, as will be described later, and the supporting member 44 is comprised of a suction pad 42 for sucking the glass plate 2 and a pair of supports 41 for supporting the glass plate 2 on the outer side of the suction pad 42. The supports 41 are detachably mounted on the outer side of the suction pad 42, and the supporting member 44 is adapted to rotate about the suction pad 42 in an R direction. The apparatus 1 for drilling holes in a glass plate further includes a hole forming means 4 for forming in the glass plate 2 holes 3 shown in FIG. 7; a supporting means 5 having the aforementioned supporting member 44 and for supporting the glass plate 2 in which the holes 3 are to be formed by the hole forming means 4; and a transporting means 6 for transporting onto the supporting means 5 the glass plate 2 in which the holes 3 are to be formed.

The hole forming means 4 includes a hole forming head 7 and a moving means 8 for moving the hole forming head 7 along an upper surface 2a of the glass plate 2. The moving means 8 is adapted to move the hole forming head 7 in an X direction and a Y direction perpendicular to the X direction with respect to the glass plate 2.

The hole forming head 7 includes a recess forming device 12 for forming in the upper surface 2a of the glass plate 2 a recess 11 shown in FIG. 7; a recess forming device 14 for forming in a lower surface 2b of the glass plate 2 a recess 13 shown in FIG. 7; a chamfering device 17 for chamfering an edge 16 of an opening 15 of the recess 11; and a chamfering device 20 for chamfering an edge 19 of an opening 18 of the recess 13.

The recess forming devices 12 and 14 and the chamfering devices 17 and 20 are respectively formed in a similar manner. Therefore, a detailed description will be given below of the recess forming device 12 and the chamfering device 17. As for the recess forming device 14 and the chamfering device 20, a reference character a will be added in the drawings, as required, and a detailed description thereof will be omitted.

The recess forming device 12 includes a recess forming drill 21 for forming the recess 11 by abutting against the upper surface 2a of the glass plate 2; a spindle motor 22 for rotating the recess forming drill 21; and a recess-forming-drill moving device (recess-forming-tool moving device) 23 for moving the recess forming drill 21 in a Z direction perpendicular to the X direction and the Y direction with respect to the glass plate 2 on a supporting surface 121. The recess forming drill 21 is connected to one end of an output rotating shaft of the spindle motor 22. It should be noted that the recess forming drill 21 is disposed in such a manner as to oppose a recess forming drill 21 a of the recess forming device 14 in the Z direction.

The recess-forming-drill moving device 23 constructed in the same way as a chamfering-drill moving device 33, which will be described below, includes an electric motor 25 fixed to a movable base 76; a pair of guide rails 26 provided on the movable base 76 in such a manner as to extend in the Z direction in parallel to each other; a threaded shaft (not shown) which is supported rotatably by the movable base 76, is connected to one end of the electric motor 25, and extends in the Z direction; a nut (not shown) threadedly engaged with this threaded shaft; and a movable base 27 to which this nut is secured and fitted to the guide rails 26. The spindle motor 22 is secured to the movable base 27.

As for the recess forming device 12, while the recess forming drill 21 is being rotated by the rotation of the output rotating shaft of the spindle motor 22 due to its operation, the movable base 27, the spindle motor 22 secured to the movable base 27, and the recess forming drill 21 connected to one end of the output rotating shaft of the spindle motor 22 are moved in the Z direction by the rotation of the output rotating shaft of the electric motor 25 due to its operation. The recess forming device 12 is thereby adapted to form the recess 11 in the upper surface 2a of the glass plate 2 by the recess forming drill 21 with such a depth that a crack, a break, or the like does not occur in the lower surface 2b of the glass plate 2. It should be noted that the hole 3 consists of the recess 11 formed by the recess forming device 12 and the recess 13 formed by the recess forming device 14 in such a manner as to communicate with the recess 11.

The chamfering device 17 juxtaposed to the recess forming device 12 includes a chamfering drill 31 for chamfering the edge 16 of the opening 15 of the recess 11 in the upper surface 2a of the glass plate 2; a spindle motor 32 for rotating the chamfering drill 31; and the chamfering-drill moving device 33 for moving the chamfering drill 31 in the Z direction. It should be noted that the chamfering drill 31 is disposed in such a manner as to oppose a chamfering drill 31a of the chamfering device 20 in the Z direction.

The chamfering-drill moving device 33 includes an electric motor 35 fixed to the movable base 76; a pair of guide rails 36 provided on the movable base 76 in such a manner as to extend in the Z direction in parallel to each other; a threaded shaft (not shown) which is supported rotatably by the movable base 76, is connected to one end of the electric motor 35, and extends in the Z direction; a nut (not shown) threadedly engaged with this threaded shaft; and a movable base 37 to which this nut is secured and fitted to the guide rails 36. The spindle motor 32 is secured to the movable base 37.

As for the chamfering device 17, while the chamfering drill 31 is being rotated by the rotation of the output rotating shaft of the spindle motor 32 due to its operation, the movable base 37, the spindle motor 32 secured to the movable base 37, and the chamfering drill 31 connected to one end of the output rotating shaft of the spindle motor 32 are moved in the Z direction by the rotation of the output rotating shaft of the electric motor 35 due to its operation. The chamfering device 17 is thereby adapted to chamfer by the chamfering drill 31 the edge 16 of the opening 15 of the recess 11 formed by the recess forming drill 21.

The recess forming drill 21 and the chamfering drill 31 are preferably constituted by hollow or solid core drills or the like impregnated with diamond abrasive grains.

The supporting means 5 includes a supporting table 122 having the supporting surface 121 for supporting the glass plate 2, as well as a rotating means 124 for rotating the supporting surface 121 in the R direction so that a peripheral edge 131 of the supporting surface 121 is disposed in the vicinity of each of portions P1 and P2 where the holes 3 are to be formed in the glass plate 2.

The supporting table 122 includes the plate-like supporting member 44 where the aforementioned supporting surface 121 extending in the X direction in FIG. 4 is formed; a cylindrical shaft 45 which is mounted on a base 43 rotatably in the R direction by means of the rotating means 124 and to an upper end of which a central portion of the supporting member 44 is secured; and a vacuum suction unit for sucking under a vacuum the lower surface 2b of the glass plate 2 mounted on the supporting member 44. The arrangement provided is such that as this vacuum suction unit is operated, the lower surface 2b of the glass plate 2 placed on the supporting member 44 is sucked under a vacuum so as to suck and fix the glass plate 2.

The supporting member 44 having an elongated shape includes the pair of plate-like supports 41 opposed to each other in the X direction in FIG. 4; a rubber member 201 for preventing the slippage of the glass plate 2 mounted on respective end portions of the pair of supports 41; the suction pad 42 interposed between the pair of supports 41 so as to be disposed substantially in a longitudinally central portion of the supporting member 44 and adapted to suck and fix the lower surface 2b of the glass plate 2 on its upper surface; a mounting portion 50 on which the suction pad 42 is mounted and the pair of supports 41 are detachably mounted, and which is supported on the shaft 45 rotatably in the R direction. The suction pad 42 is provided with suction ports 202 communicating with the aforementioned vacuum suction unit. The pair of supports 41 are mounted on the base 43 by means of the shaft 45 and the rotating means 124 rotatably in the R direction about the rotational axis O of the shaft 45. The suction pad 42 may be mounted on the base 43 immovably in the R direction by means of the mounting portion 50 and the shaft 45, or may be mounted on the base 43 rotatably in the R direction. The pair of supports 41 are detachably mounted on the mounting portion 50 on the outer side of the suction pad 42. The supporting member 44 is adapted to be rotated about the suction pad 42 in the R direction by the operation of the rotating means 124.

The area of the supporting surface 121 is smaller than the area of the lower surface 2b of the glass plate 2, and is adapted to come into contact with a portion of the lower surface 2b of the glass plate 2. The peripheral edge 131 of the supporting surface 121 has a shape such as the one shown in FIG. 4 in this embodiment, but may have, for instance, a triangular shape, a quadrangular shape (including a rectangular shape), a polygonal shape, a circular shape, an elliptical shape, or the like. The supporting surface 121 is point symmetrical, and the rotational axis O is disposed at the center of the point symmetry. A distance L1 from an arbitrary first portion 132 at the peripheral edge (peripheral edge portion) 131 of the support 41 to the rotational center O is different from a distance L2 from an arbitrary second portion 133, which is different from the first portion 132, at the peripheral edge (peripheral edge portion) 131 of the aforementioned support 41 to the rotational center O, and the distance L1 is longer than the distance L2 here. The shape of the peripheral edge of the support 41 is noncircular in this embodiment.

The rotating means 124 includes an electric motor disposed in a case 51, as well as a rotation transmitting mechanism consisting of a gear and the like for transmitting the rotation of an output rotating shaft of the electric motor to the shaft 45. The rotating means 124 is arranged such that as the shaft 45 is rotated in the R direction by the electric motor in the case 51, the supporting surface 121 of the supporting member 44 secured to the shaft 45 is rotated in the R direction with respect to the glass plate 2.

The moving means 8 includes an X-axis moving device 61 for moving the hole forming head 7 in the X direction with respect to the glass plate 2 on the supporting surface 121, as well as a Y-axis moving device 62 for moving the hole forming head 7 in the Y direction with respect to the glass plate 2 on the supporting surface 121. As these devices are operated in an interlocked manner, the moving device 8 is adapted to commonly move the recess forming drill 21 and the chamfering drill 31 in the X direction and the Y direction.

The X-direction moving device 61 includes an electric motor 65 fixed to a frame 64; a pair of guide rails 66 secured to a lower surface of the frame 64 and extending in the X direction in parallel to each other; a movable base 67 fitted in the guide rails 66 movably in the X direction; a nut 68 secured to an upper surface of the movable base 67; and a threaded shaft 72 which is threadedly engaged with the nut 68, is supported rotatably by the frame 64, and is connected to an output rotating shaft of the electric motor 65 through a pulley 69, a belt 70, and a pulley 71. The rotation of an output rotating shaft of the electric motor 65 due to its operation is transmitted to the pulley 69, the belt 70, and the pulley 71. As the threaded shaft 72 is rotated, the nut 68 threadedly engaged with the threaded shaft 72 is moved in the X direction, and the movable base 67 to which the nut 68 is secured is adapted to move in the X direction while being guided in the X direction by the guide rails 66.

The Y-direction moving device 62 includes an electric motor 72; a threaded shaft 74 which is connected to one end of an output rotating shaft of the electric motor 73 and extends in the Y direction; a nut 75 threadedly engaged with the threaded shaft 74 and secured to the lower surface of the movable base 67; the movable base 76 which supports the threaded shaft 74 rotatably and on which the electric motor 73 is mounted; and a pair of guide rails 77 which are provided on the upper surface of the movable base 76 in such a manner as to extend in the Y direction in parallel to each other and are fitted in the lower surface of the movable base 67 movably in the Y direction. The threaded shaft 74 is rotated by the rotation of an output rotating shaft of the electric motor 73 due to its operation. This rotation causes the threaded shaft 74 to relatively move in the Y direction with respect to the nut 75 threadedly engaged with the threaded shaft 74 and the movable base 67 secured to the nut 75. At the same time, the movable base 76 which rotatably supports the threaded shaft 74 is moved in the Y direction while being guided by the guide rails 77.

The transporting means 6 includes a carrying-in table 100 for supporting the glass plate 2 which is carried onto the supporting table 122; a carrying-out table 101 for supporting the glass plate 2 which is carried out from the supporting table 122; a lifting device 81 for lifting the glass plate 2 supported on the carrying-in table 100; a lifting device 135 for lifting the glass plate 2 supported on the supporting table 122; and a glass-plate moving device 82 for moving in the X direction the glass plate 2 which has been lifted by each of the lifting devices 81 and 135. Each of the lifting devices 81 and 135 is adapted to place on the supporting surface 121 the glass plate 2 in which the hole 3 is to be formed, after that supporting surface 121 has been rotated by the rotating means 124.

Each of the carrying-in table 100 and the carrying-out table 101 has a cylindrical shaft 102 secured to the base 43 and a supporting plate 103 secured to an upper end of the shaft 102. The carrying-in table 100 is disposed closer to the carrying-in end side of the apparatus 1 for drilling holes in a glass plate than to the supporting table 122, while the carrying-out table 101 is disposed closer to the carrying-out end side of the apparatus 1 for drilling holes in a glass plate than to the supporting table 122.

Each of the lifting devices 81 and 135 has a suction head 83 for holding the glass plate 2 and a cylinder unit 84 for raising or lowering the suction head 83.

Each suction head 83 has a vacuum suction unit for sucking under a vacuum the glass plate 2, a suction port communicating with this vacuum suction unit, and a suction pad 85 provided with the suction port. The arrangement provided is such that as the vacuum suction unit is operated, the upper surface 2a of the glass plate 2 is sucked under a vacuum so as to suck and fix the glass plate 2.

Each of the cylinder units 84 consists of a cylinder 86 and a piston rod 87, and the suction head 83 is secured to a distal end of the piston rod 87. The arrangement provided is such that the piston rod 87 is extended or retracted by fluid pressure such as air pressure or oil pressure applied to the interior of the cylinder 86, so as to raise or lower the suction head 83 in the Z direction.

When the lifting device 81, together with the glass plate 2 in which the holes 3 are to be formed, is moved in the X direction and is disposed above the supporting table 122 by the glass-plate moving device 82, the lifting device 81 is adapted to release the lifting of the glass plate 2 and place that glass plate 2 on the supporting surface 121. When the lifting device 135, together with the glass plate 2 in which the holes 3 have been formed, is moved in the X direction and is disposed above the carrying-out table 101 by the glass-plate moving device 82, the lifting device 135 is adapted to release the lifting of the glass plate 2 and place that glass plate 2 on the carrying-out table 101.

The glass-plate moving device 82 includes an electric motor 91 fixed to a frame 90; a pair of guide rails 92 fixed to the frame 90 in such a manner as to extend in the X direction in parallel to each other; a movable base 93 fitted in the guide rails 92 movably in the X direction; a nut 94 secured to the movable base 93; a threaded shaft 98 which is threadedly engaged with the nut 94, is supported rotatably by the frame 90, is connected to an output rotating shaft of the electric motor 91 through a pulley 95, a belt 96, and a pulley 97, and extends in the X direction; and a pair of brackets 99 which are each secured at its one end to the movable base 93 and is secured at its other end to the cylinder 86. The rotation of an output rotating shaft of the electric motor 91 due to its operation is transmitted to the threaded shaft 98 through the pulley 95, the belt 96, and the pulley 97. As the threaded shaft 98 is rotated, the nut 94 threadedly engaged with the threaded shaft 98, the movable base 93 secured to the nut 94, the brackets 99 secured to the movable base 93, and the lifting devices 81 and 135 secured to the respective brackets 99 are adapted to move in the X direction.

The apparatus 1 for drilling holes in a glass plate has a numeral controller (not shown), and this numerical controller is adapted to control the above- and below-described operation of each of the electric motors 25, 35, 65, 73, and 91, the electric motor of the rotating means 124, the vacuum suction units, and the cylinder units 84 by numerical control commands based on a program stored in advance.

In a case where drilling is effected at the portions P1 and P2 of the glass plate 2 by the apparatus 1 for drilling holes in a glass plate in accordance with this embodiment, the glass plate 2, which is supported on the carrying-in table 100 and in which the plurality of holes 3 are to be formed, is first lifted by the lifting device 81 located above the carrying-in table 100, as shown in FIG. 1. The lifted glass plate 2 is moved in the X direction by the glass-plate moving device 82 and is disposed above the supporting table 122, as shown in the part (a) of FIG. 3, and that glass plate 2 is lowered by the lifting device 81 and is placed on the supporting surface 121 of the suction pad 42. The lower surface 2b of the placed glass plate 2 is sucked through the suction ports 202 by the actuation of the vacuum suction unit and is sucked and fixed to the suction pad 42, thereby supporting on the supporting surface 121 the glass plate 2 in which the holes 3 are to be formed. Here, before the glass plate 2 is placed on the supporting surface 121 by the lifting device 81, the rotating means 124 rotates the supporting surface 121 through a desired angle in the R direction from its initial rotating position shown in FIG. 4 so that the peripheral edge 131 of the supporting surface 121 is disposed in the vicinity of the portion P1 of the glass plate 2 where the hole 3 is first to be formed, thereby effecting positioning to allow the glass plate 2 to assume the state shown in FIG. 5.

Next, the hole forming head 7 is moved by the moving means 8 in the X direction and the Y direction with respect to the glass plate 2 supported on the supporting surface 121, to respectively dispose the recess forming drill 21, which is rotated by the operation of the spindle motor 22, above the portion P1 in the upper surface 2a of the glass plate 2 and the recess forming drill 21 a, which is rotated by the operation of a spindle motor 22a, below the portion P1 in the lower surface 2b of the glass plate 2. The recess forming drill 21 is then lowered by the recess-forming-drill moving device 23 and is abutted against the portion P1 in the upper surface 2a of the glass plate 2 to form the recess 11 with such a depth that a crack, a break, or the like does not occur on the lower surface 2b side. Subsequently, the recess forming drill 21 is raised by the recess-forming-drill moving device 23 to move away from the upper surface 2a of the glass plate 2. Then, the recess-forming drill 21a is raised by a recess-forming-drill moving device 23a and is abutted against the portion P1 in the lower surface 2b of the glass plate 2, thereby forming the recess 13 communicating with the recess 11. Subsequently, the recess forming drill 21a is lowered by the recess-forming-drill moving device 23a and is moved away from the lower surface 2b of the glass plate 2. It should be noted that, during the forming of the hole 3 with respect to the portion P1 by the hole forming means 4, the lifting device 81 is disposed above the carrying-in table 100 and the lifting device 135 is disposed above the supporting table 122 by the operation of the glass-plate moving device 82.

Next, the recess forming devices 12 and 14 and the chamfering devices 17 and 20 are commonly moved by the moving means 8 such that the recess forming drill 21 is removed from above the recess 11 at the portion P1 and the recess forming drill 21a is removed from below the recess 13 at the portion P1, and such that the chamfering drill 31 is disposed above the recess 11 at the portion P1 and the chamfering drill 31a is disposed below the recess 13 at the portion P1. The chamfering drill 31 disposed above the recess 11 is lowered by the chamfering-drill moving device 33 and is abutted against the edge 16 of the opening 15 of the recess 11 at the portion P1 of the glass plate 2 to chamfer that edge 16. Subsequently, the chamfering drill 31 is raised by the chamfering-drill moving device 33 and is moved away from the edge 16 of the glass plate 2. Then, the chamfering drill 31a is raised by a chamfering-drill moving device 33a and is abutted against the edge 19 of the opening 18 of the recess 13 at the portion P1 of the glass plate 2 to chamfer that edge 19. Subsequently, the chamfering drill 31a is lowered by the chamfering-drill moving device 33a and is moved away from the edge 19 of the glass plate 2. The hole 3 is formed in the portion P1 of the glass plate 2 in the above-described manner.

After the hole 3 provided with chamfering has been formed at the portion P1, the suction of the glass plate 2 by the supporting table 122 is released, and the glass plate 2 on the supporting surface 121 is raised by the lifting device 135 and is temporarily moved away from the supporting surface 121, as shown in the part (b) of FIG. 3.

Next, the supporting surface 121 is rotated by the rotating means 124 through a desired angle in the R direction after undergoing a transition from the state shown in FIG. 5 to the state shown in FIG. 4 so that the peripheral edge 131 is disposed in the vicinity of the portion P2 of the glass plate 2 where the hole 3 is to be formed following the portion P1, thereby effecting positioning so as to assume the state shown in FIG. 6. After the supporting surface 121 is thus rotated, the moving away of the glass plate 2 from the supporting surface 121 by the lifting device 135 is released, and that glass plate 2 is lowered to be supported again on the supporting surface 121. Next, the hole forming head 7 is moved by the moving means 8 to dispose the recess forming drills 21 and 21 a above and below that portion P2, and by performing the operation similar to that described above, the hole 3 provided with chamfering is formed in the portion P2.

Next, the operation of the vacuum suction unit of the supporting table 122 is stopped to cancel the support by the supporting surface 121 of the glass plate 2 where the holes 3 have been formed in the portions P1 and P2, respectively. The released glass plate 2 on the supporting surface 121 is lifted by the lifting device 135, and the lifted glass plate 2 is moved in the X direction by the glass-plate moving device 82 and is disposed above the carrying-out table 101. The glass plate 2 is lowered by the lifting device 135 and is placed on the carrying-out table 101, thereby carrying out from the supporting surface 122 the glass plate 2 with the holes 3 formed therein. It should be noted that the chamfering of the edges 16 and 19 by the chamfering devices 17 and 20 may be started concurrently.

As described above, according to the apparatus 1 for drilling holes in a glass plate, the supporting member 44 is rotated in the R direction in a preliminary step for placing the glass plate 2 on the supporting member 44, so as to move the supports 41 of the supporting member 44 for supporting the glass plate 2 to a portion of the glass plate 2 in which deflection can possibly occur when the glass plate 2 is in a posture of being subjected to drilling. After the rotation of the supporting member 44, the glass plate 2 to be drilled is placed on the supporting member 44 and is sucked and supported thereby, and the sucked and supported glass plate 2 can then be drilled. Thus, it is possible to support glass plates 2 of various sizes and shapes without causing deflection, particularly deflection at both longitudinal end sides of the glass plate 2, without needing to replace the supporting member 44 for supporting (holding) the glass plate 2, thereby making it possible to perform satisfactory hole drilling.

According to the apparatus 1 for drilling holes in a glass plate, the supporting member 44 for sucking and supporting the glass plate 2 is comprised of the suction pad 42 for sucking the glass plate 2 and the pair of supports 41 for supporting the glass plate 2 on the outer side of the suction pad 42, and the supports 41 are detachably mounted on the outer side of the suction pad 42, the supporting member 44 being adapted to rotate about the suction pad 42 in the R direction. Therefore, before the glass plate 2 is supplied to the supporting member 44, in order to support the portion of the glass plate 2 in which deflection can possibly occur when the glass plate 2 is in a posture of being subjected to drilling, the supporting member 44 is rotated in advance in the R direction to position the supporting member 44 at the portion of the glass plate 2 in which deflection can possibly occur. In due course of time, the glass plate 2 can be supplied, and sucked and supported, and hole drilling can be performed. For this reason, it becomes unnecessary to prepare the supporting members 44 of various sizes and shapes in correspondence with the sizes and shapes of the glass plates 2, so that extra operation of replacing the supporting member 44 becomes unnecessary. In addition, in cases where the glass plate 2 is small, it suffices if the supports 41 on the outer side of the suction pad 42 are kept removed.

In addition, according to the apparatus 1 for drilling holes in a glass plate, there are provided the hole forming means 4 for forming the holes 3 in the glass plate 2; the supporting means 5 for supporting the glass plate 2 in which the holes 3 are to be formed by the hole forming means 4; and the transporting means 6 for transporting onto the supporting means 4 the glass plate 2 in which the holes 3 are to be formed. The supporting means 5 includes the supporting surface 121 for supporting the glass plate 2 as well as the rotating means 124 for rotating the supporting surface 121 in the R direction with respect to the glass plate 2 so that the peripheral edge 131 of the supporting surface 121 is disposed in the vicinity of each of portions P1 and P2 where the holes 3 are to be formed in the glass plate 2. After the supporting surface 121 is rotated by the rotating means 124, the transporting means 6 is adapted to place on the supporting surface 121 the glass plate 2 in which the hole 3 is to be formed, so as to allow that glass plate 2 to be supported on the supporting surface 121. Therefore, it is possible to render the configuration simple without increasing the number of parts, and drilling can be performed accurately with respect to the glass plates 2 of various sizes and shapes without causing deflection particularly at the portions P1 and P2 of the glass plate 2.

It should be noted that the moving means 8 may be constructed such that each of the recess forming device 12 and the chamfering device 17 as well as the recess forming device 14 and the chamfering device 20 is provided with an X-direction moving device and a Y-direction moving device which are equivalent to the X-axis moving device 61 and the Y-axis moving device 62, so that the recess forming device 12 and the chamfering device 17 located on the upper surface 2a side as well as the recess forming device 14 and the chamfering device 20 located on the lower surface 2b side can be moved individually in the X direction and the Y direction.

It should be noted that the supporting table 122 may have a supporting surface 205 which is rectangular in shape and point symmetrical, as shown in FIG. 8, instead of the supporting surface 121, and the rotational axis O of such a supporting surface 121 may be disposed in such a manner as to be off-centered from the center of point symmetry of that supporting surface 121.

Figure 1:
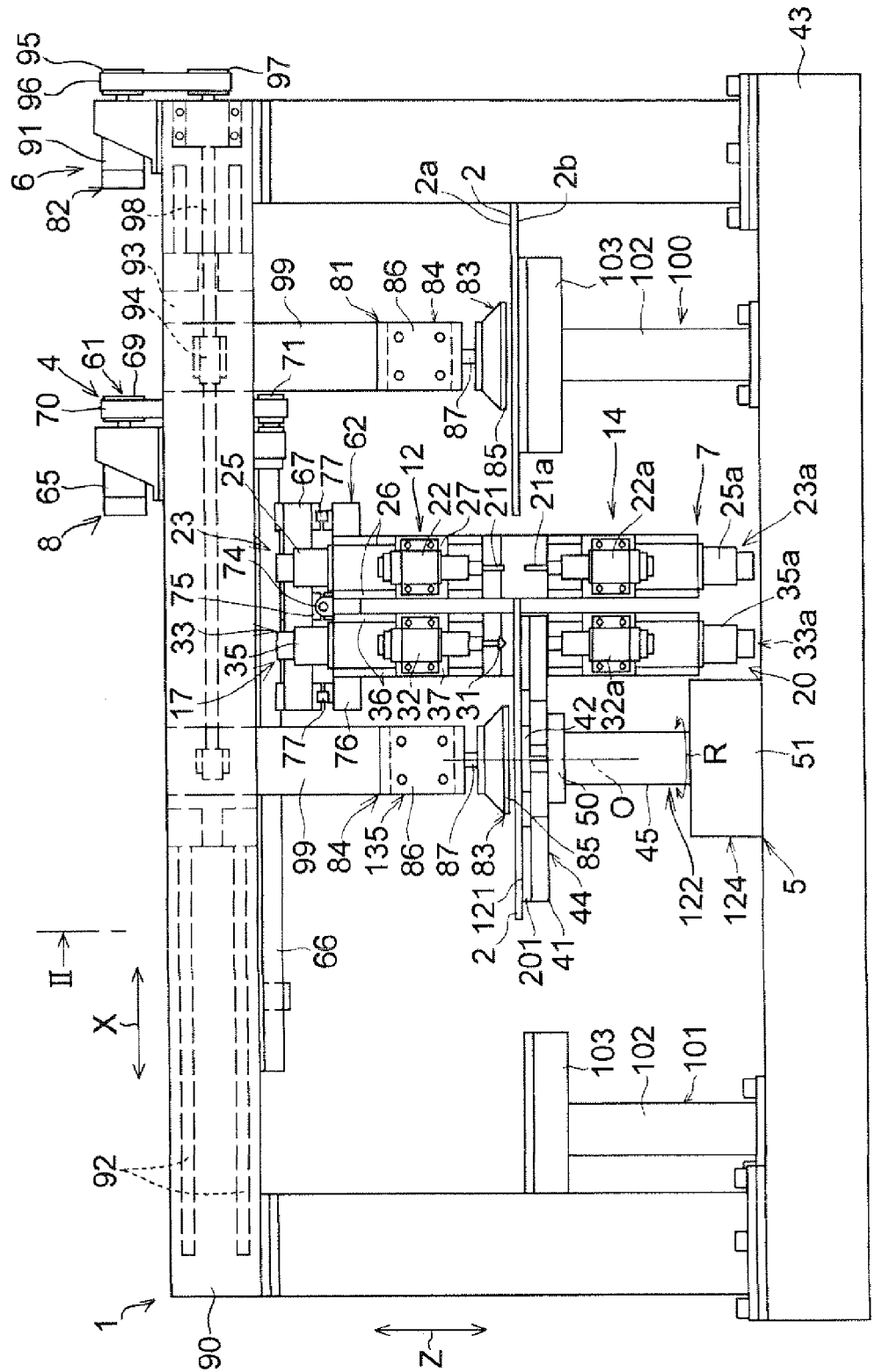
FIG. 1 is an explanatory front view of an embodiment of the invention.
Figure 2:
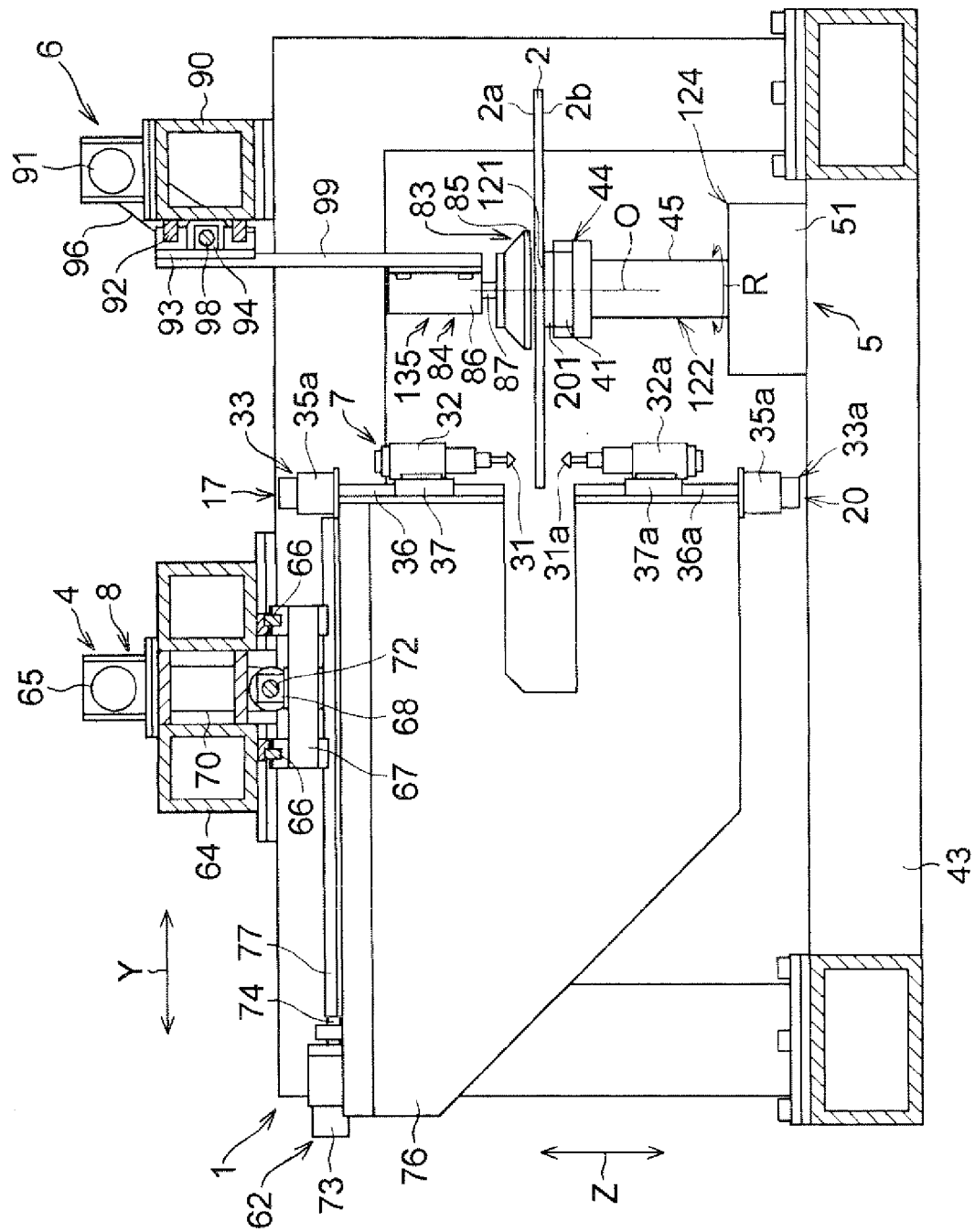
FIG. 2 is an explanatory cross-sectional view, taken in the direction of arrows along line II-II, of the embodiment shown in FIG. 1.
Figure 3:
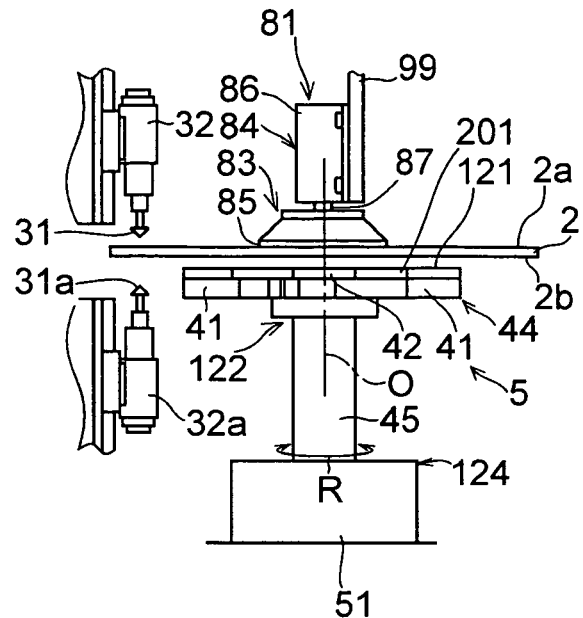
Figure 3:
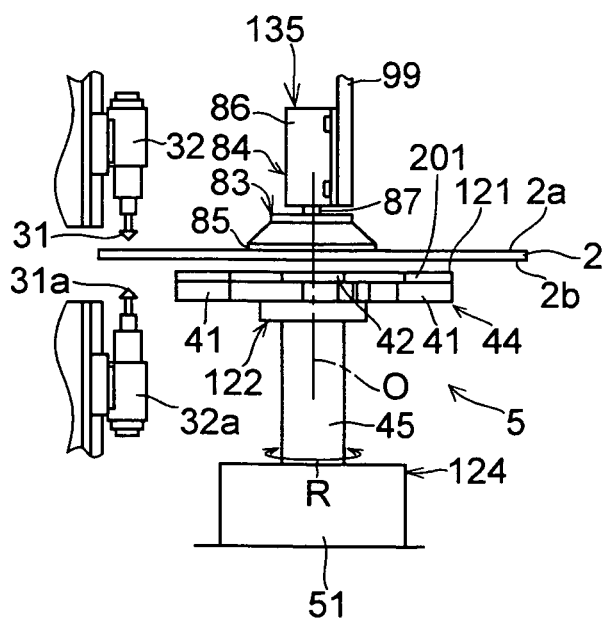
Figure 4:
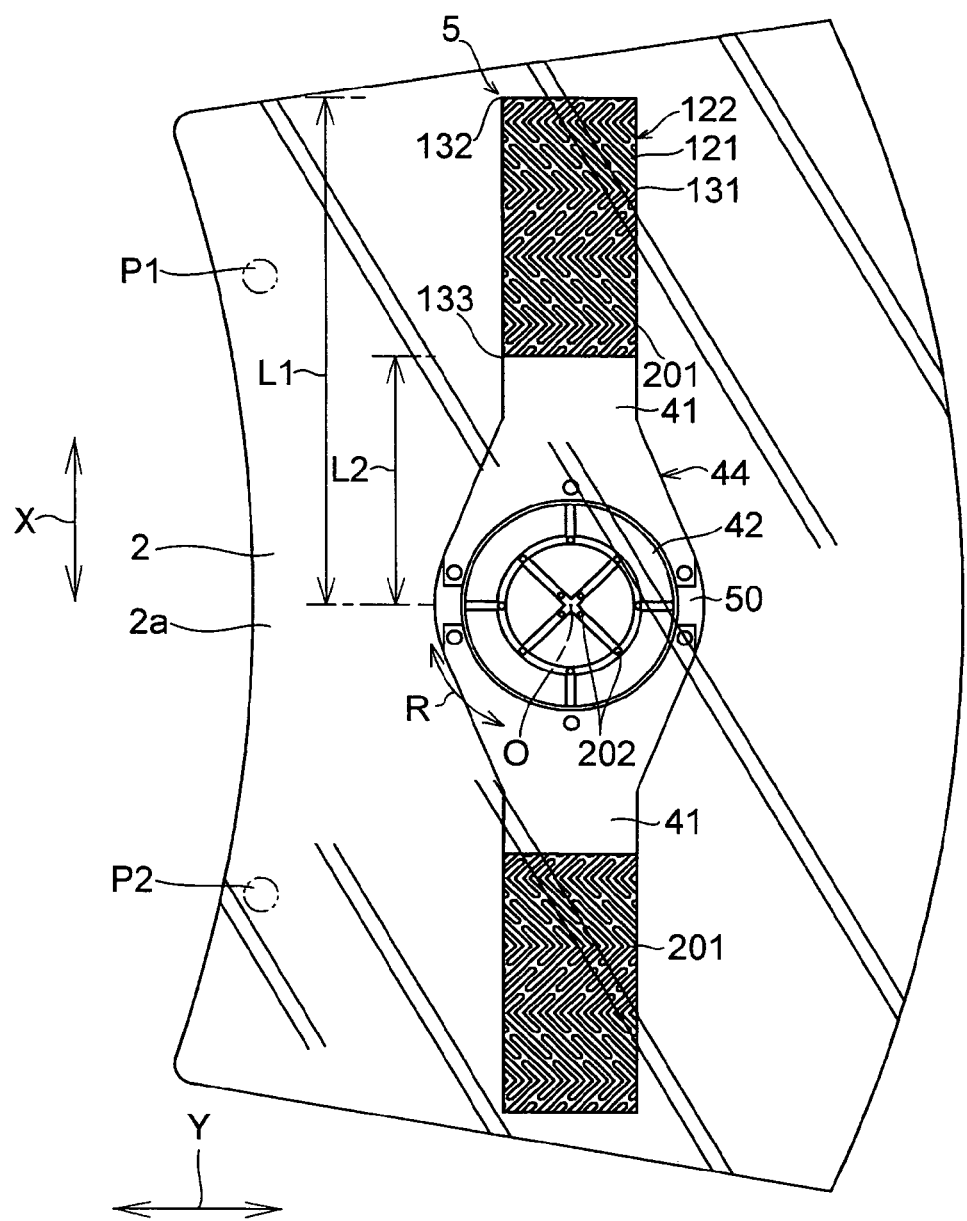
Figure 5:
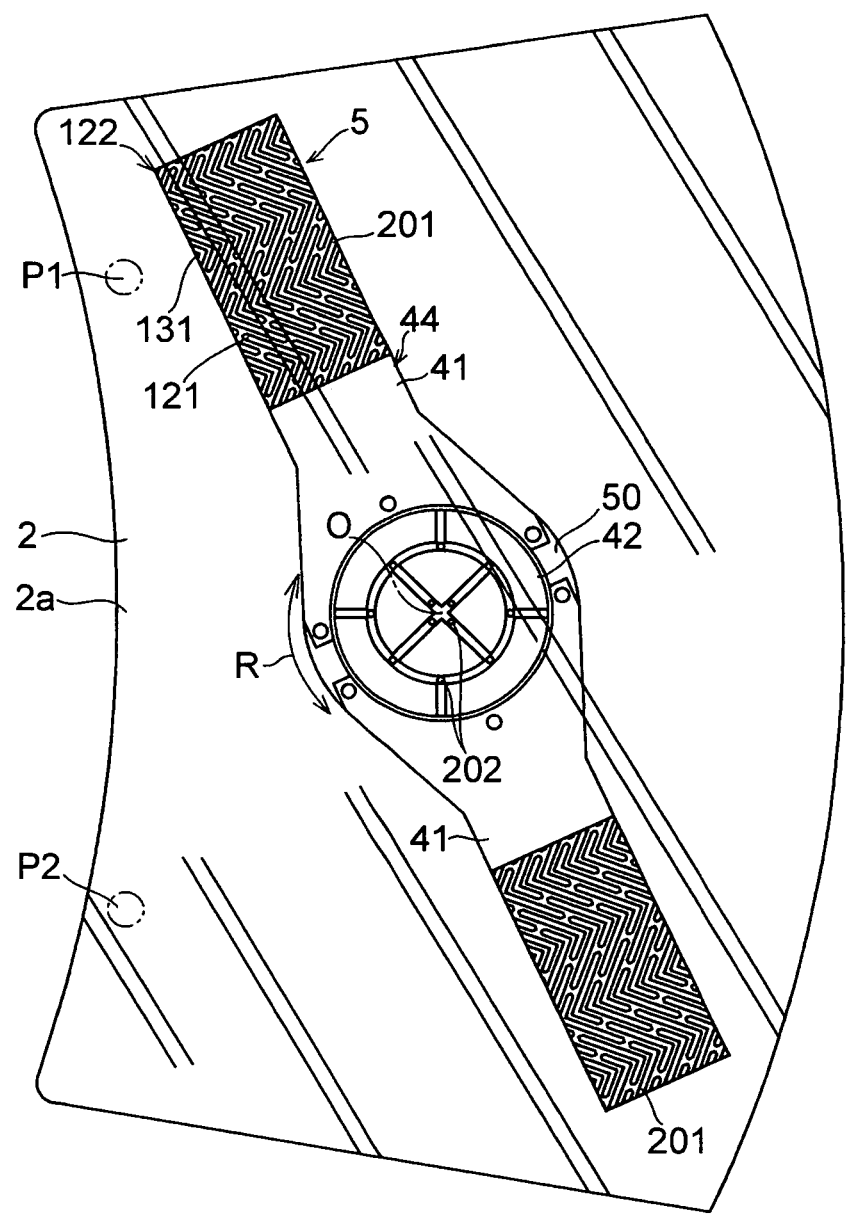
Figure 6:
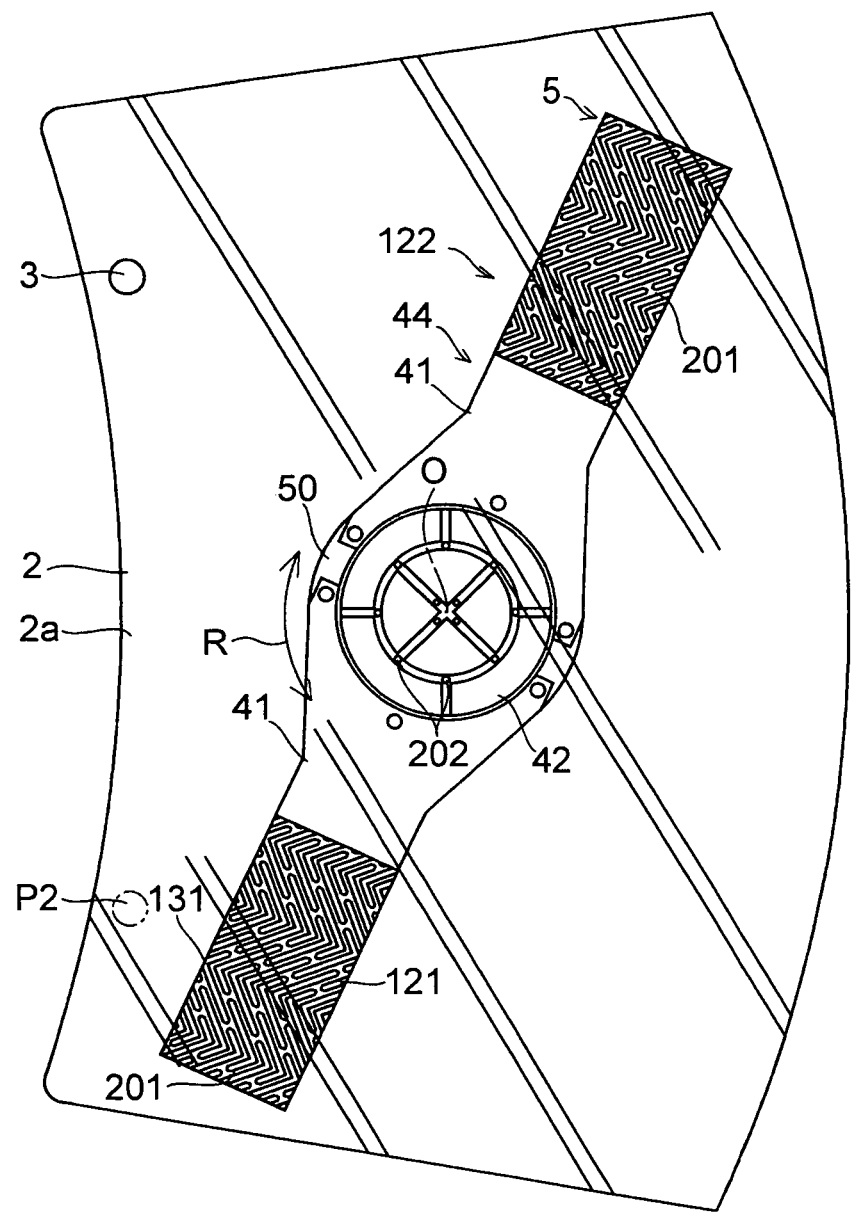
Figure 7:
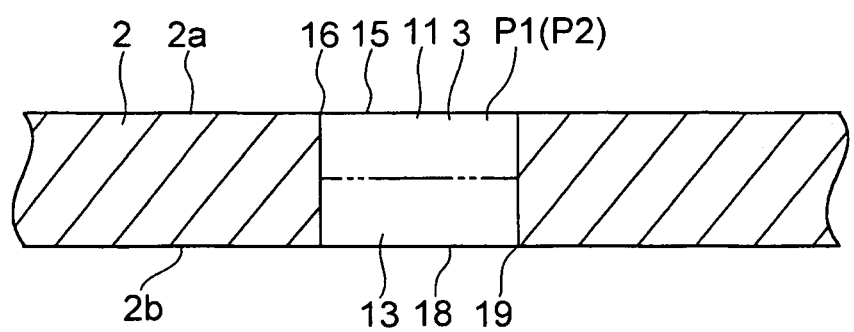
Figure 8:
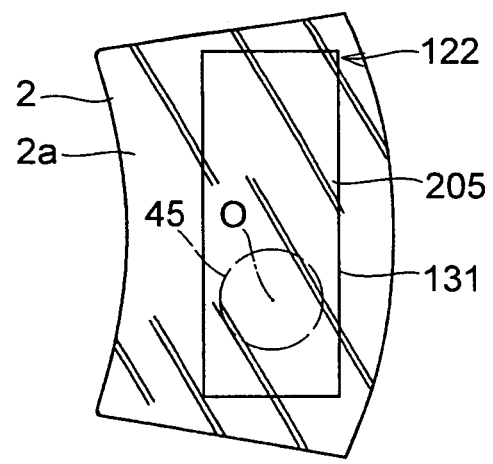

Parts (a) and (b) of FIG. 3 are diagrams explaining partial operation of the embodiment shown in FIG. 1;

FIG. 4 is an explanatory enlarged plan view of mainly a supporting member of the embodiment shown in FIG. 1;

FIG. 5 is a diagram explaining the operation of mainly the supporting member of the embodiment shown in FIG. 1;

FIG. 6 is a diagram explaining the operation of mainly the supporting member of the embodiment shown in FIG. 1;

FIG. 7 is an explanatory diagram of a hole which is formed in the glass plate in accordance with the embodiment shown in FIG. 1; and FIG. 8 is an explanatory diagram of mainly another supporting table of the embodiment shown in FIG. 1.

DESCRIPTION OF REFERENCE NUMERALS AND SIGNS

1: apparatus for drilling holes in a glass plate
2: glass plate
3: hole
4: hole forming means
5: supporting means
6: transporting means
41: support
42: suction pad
44: supporting member
50: mounting portion
121, 205: supporting surface
124: rotating means
131: peripheral edge

The invention claimed is:
1. An apparatus for drilling holes in a glass plate, comprising:
- a hole forming mechanism adapted to form holes in a glass plate, and
- a supporting member for sucking and supporting the glass plate in which the holes are to be formed by the hole forming mechanism,
- said supporting member being comprised of a suction pad for sucking the glass plate and a support for supporting the glass plate on an outer side of said suction pad, said supporting member being adapted to rotate about an axis of said suction pad as a rotational center.

* * * * *